United States Patent
Ludloff et al.

(10) Patent No.: US 8,359,443 B2
(45) Date of Patent: *Jan. 22, 2013

(54) SECURE MEMORY ACCESS SYSTEM AND METHOD

(76) Inventors: Christian Ludloff, San Jose, CA (US); Kurt Daverman, San Jose, CA (US); Andrew Morgan, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,560

(22) Filed: Jun. 21, 2011

(65) Prior Publication Data

US 2012/0159104 A1    Jun. 21, 2012

Related U.S. Application Data

(63) Continuation of application No. 12/391,998, filed on Feb. 24, 2009, now Pat. No. 7,966,467, which is a continuation of application No. 11/296,591, filed on Dec. 6, 2005, now Pat. No. 7,496,727.

(51) Int. Cl.
*G06F 12/00* (2006.01)
(52) U.S. Cl. ........................................ 711/163
(58) Field of Classification Search ........................ None
See application file for complete search history.

(56) References Cited

U.S. PATENT DOCUMENTS

| | | | |
|---|---|---|---|
| 5,034,980 A | 7/1991 | Kubota | |
| 5,463,535 A | 10/1995 | Vest | |
| 5,596,741 A | 1/1997 | Thome | |
| 5,729,760 A | 3/1998 | Poisner | |
| 5,748,744 A | 5/1998 | Levy et al. | |
| 5,835,594 A | 11/1998 | Albrecht et al. | |
| 5,991,399 A | 11/1999 | Graunke et al. | |
| 6,011,908 A | 1/2000 | Wing et al. | |
| 6,031,992 A | 2/2000 | Cmelik et al. | |
| 6,038,320 A | 3/2000 | Miller | |
| 6,044,157 A | 3/2000 | Uesaka et al. | |
| 6,061,449 A | 5/2000 | Candelore et al. | |
| 6,172,990 B1 | 1/2001 | Deb et al. | |
| 6,175,896 B1 | 1/2001 | Bui | |
| 6,199,152 B1 | 3/2001 | Kelly et al. | |
| 6,249,782 B1 | 6/2001 | Day et al. | |
| 6,292,874 B1 | 9/2001 | Barnett | |
| 6,327,660 B1 | 12/2001 | Patel | |
| 6,363,486 B1 | 3/2002 | Knapton et al. | |
| 6,401,208 B2 | 6/2002 | Davis et al. | |
| 6,408,376 B1 | 6/2002 | Ganapathy et al. | |
| 6,415,379 B1 | 7/2002 | Keppel et al. | |
| 6,453,233 B1 | 9/2002 | Kato | |
| 6,507,904 B1 | 1/2003 | Ellison et al. | |
| 6,510,521 B1 | 1/2003 | Albrecht et al. | |
| 6,523,118 B1 | 2/2003 | Buer | |
| 6,587,949 B1 | 7/2003 | Steinberg | |
| 6,633,963 B1 | 10/2003 | Ellison et al. | |
| 6,704,872 B1 | 3/2004 | Okada | |
| 6,910,094 B1 | 6/2005 | Eslinger et al. | |
| 6,983,374 B2 | 1/2006 | Hashimoto et al. | |
| 6,986,052 B1 | 1/2006 | Mittal | |
| 7,082,615 B1 | 7/2006 | Ellison et al. | |

(Continued)

OTHER PUBLICATIONS

Fordahl, M., "Transmeta Unveils Long-Awaited Next Generation Processor", Yahoo Finance, Oct. 14, 2003, pp. 1-2.

(Continued)

*Primary Examiner* — Hiep Nguyen

(57) ABSTRACT

A secure memory access system and method for providing secure access to Hyper Management Mode memory ranges is presented.

20 Claims, 2 Drawing Sheets

U.S. PATENT DOCUMENTS

| | | | |
|---|---|---|---|
| 7,370,210 B2 * | 5/2008 | Symes | 713/189 |
| 2001/0019559 A1 | 9/2001 | Hanler et al. | |
| 2002/0040436 A1 | 4/2002 | Davis et al. | |
| 2002/0107856 A1 | 8/2002 | Scheussler et al. | |
| 2002/0156981 A1 | 10/2002 | Chong | |
| 2003/0041221 A1 | 2/2003 | Okada | |
| 2003/0061598 A1 | 3/2003 | Karp et al. | |
| 2004/0015694 A1 | 1/2004 | DeTreville | |
| 2004/0143720 A1 | 7/2004 | Mansell et al. | |
| 2009/0132969 A1 | 5/2009 | Mayer | |

OTHER PUBLICATIONS

Microsoft, "Next-Generation Secure Computing Base: An Overview", Sep. 8, 2003, pp. 1-2.

Microsoft, "Next-Generation Secure Computing Base: The Road to Security", Sep. 8, 2003, pp. 1-2.

Microsoft, "Next-Generation Secure Computing Base: Product Information", Sep. 8, 2003, pp. 1-2.

Microsoft, "Next-Generation Secure Computing Base: Four Key Features", Jun. 2003, pp. 1-3.

Microsoft, "Next-Generation Secure Computing Base: Technical FAQ", Jul. 2003, pp. 1-9.

Microsoft, "Press Pass Information for Journalists; Q & A: Microsoft Seeks Industry-Wide Collaboration for 'Palladium' Initiative", Jan. 25, 2003, pp. 1-4.

Microsoft, "Press Pass Information for Journalists; The Journey to Trustworthy Computing: Microsoft Execs Report Firts-Year Progress", Jan. 15, 2003, pp. 1-7.

Microsoft, "Press Pass Information for Journalists; Q & A: Delivering on Secure Computing", Apr. 14, 2003, pp. 1-6.

Microsoft, "Press Pass Information for Journalists; At WINHEC, Microsoft Discusses Details of Next Generation Secure Computing Base", May. 7, 2003, pp. 1-4.

Transmeta, "Crusoe—The Technology—The Architecture—Code Morphing Software", Mar. 14, 2003, pp. 1-3.

Transmeta, "Crusoe—The Technology—The Architecture—Longrun Power Management Technology", Mar. 14, 2003, pp. 1-3.

Microsoft, "Hardware Platform for the Next-Generation Secure Computing Base", Jan. 2003, pp. 1-10.

Microsoft, "NGSCB: Trusted Computing Base and Software Authetication", Jan. 2003, pp. 1-16.

Microsoft, "Security Model for the Next-Generation Secure Computing Base", Jan. 2003, pp. 1-13.

Klaiber, A., "The Technology Behind Crusoe Processors", Transmeta Corp. Manual, Jan. 2000, pp. 1-18.

* cited by examiner

SECURE MEMORY ACCESS SYSTEM AND METHOD

CROSS-REFERENCE TO RELATED APPLICATIONS

This application is a Continuation of and claims priority to U.S. patent application Ser. No. 12/391,998, filed on Feb. 24, 2009 and now issued as U.S. Pat. No. 7,966,467, which is a Continuation of and claims priority to U.S. patent application Ser. No. 11/296,591, filed on Dec. 6, 2005 and now issued as U.S. Pat. No. 7,496,727, which are hereby incorporated by reference in their entirety.

FIELD

Embodiments relate to the field of memory access type designations.

BACKGROUND

Electronic devices and systems have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas, and trends in most areas of business, science, education and entertainment. These electronic devices often include processors that process information stored in a memory. The information in said memory is typically accessed by read and write operations. These so-called memory accesses usually have a designated type and improperly typed memory accesses can cause problems.

SUMMARY

A secure memory access system and method for providing secure access to Hyper Management Mode memory ranges is presented.

BRIEF DESCRIPTION OF THE DRAWINGS

The accompanying drawings, which are incorporated in and form a part of this specification, illustrate embodiments, together with the description, serve to explain the principles of the disclosure.

DETAILED DESCRIPTION

Figure 1:
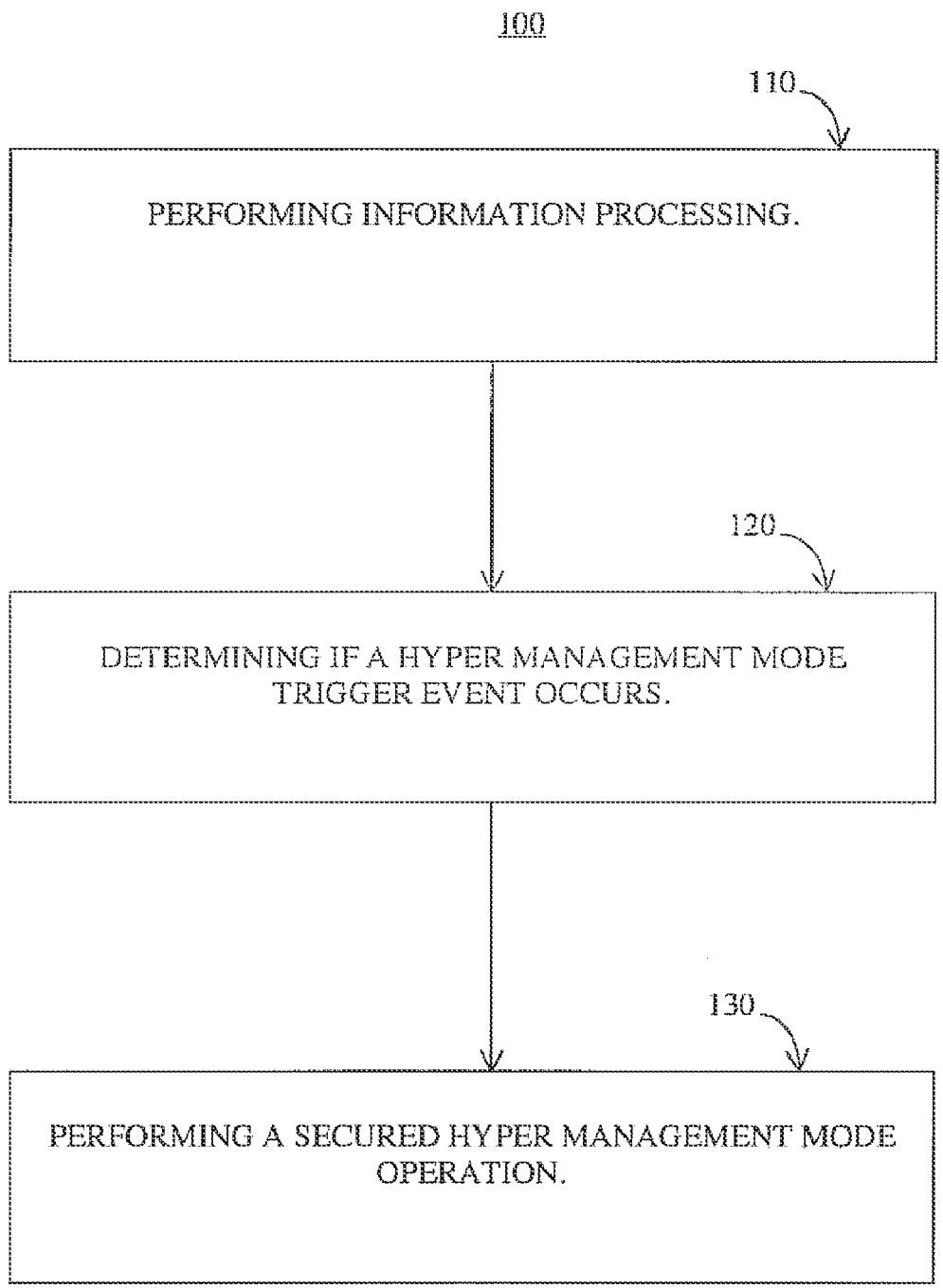
FIG. 1 is a flow chart of an exemplary secure Hyper Management Mode method in accordance with one embodiment.

Reference will now be made in detail to embodiments, examples of which are illustrated in the accompanying drawings. While the disclosure will be described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description, numerous specific details are set forth in order to provide a thorough understanding. However, it will be recognized by one of ordinary skill in the art that embodiments may be practiced without these specific details.

In one embodiment, a Hyper Management Mode (HMM) is utilized to perform a variety of special management operations. Hyper Management Mode is initiated if a certain sequence of events occurs. When said sequence of events occurs, a Hyper Management Interrupt (HMI) is generated and the processor is directed to access Hyper Management Mode instructions in memory. A portion of said memory is assigned to store the directions or instructions (e.g. a hypervisor, interrupt handler, etc.) for performing the Hyper Management Mode operations. In a system with Random Access Memory (RAM) the portion of the memory storing the Hyper Management Mode instructions is referred to as the Hyper Management Random Access Memory (HMRAM).

The locations in main memory are accessed for reading and writing contents. There are a variety of access types that define how the memory is accessed. For example, memory types determine if information is cached when it is read from or written to a memory region, if information can be accessed in order or out of order, etc. In one embodiment, the memory types include uncached (UC), write combining (WC), write protected (WP), write through (WT) and write back (WB). Uncached means that when the memory region is accessed, information is read or written straight from the storage location without buffering in a cache. Write combining is similar in that when information is written to memory multiple times, the information is merged or combined into one large block that is written in one access, efficiently using bandwidth. Write combining is used typically for devices that transfer information in relatively large chunks, such as graphics controllers, LAN controllers, etc.

The memory types can have similarities. For example, write through and write back involve caching. For write through, when information is written it is cached and directed to write through to an end storage device. For write back, the information is written to a cache, which can write it to the end storage device whenever it is convenient.

A memory region cannot be designated as more than one type at a time.

In one embodiment, input/output (I/O) devices utilize uncached and write combining memory types. In one exemplary implementation, there is a block of controllers associated with the I/O device and there is a block of main memory assigned to the device's communication buffers. Said buffers are marked as write combining so that they can be written to very quickly and efficiently, while the control registers are marked as uncached. The buffer is filled with write combining writes and then one or more control registers are written, directing the buffer to communicate the information in one large block.

The different types of memory access have various characteristics. For example, write protect is relatively secure in that it prevents information from being overwritten. The memory addresses can range from 0 to the maximum supported by a particular system. In one embodiment, memory addresses 0 to 640 KB and 1 MB to 128 MB are cachable memory. The 1 MB to 128 MB range can be assigned a write back access type, which is cachable and relatively fast. The 640 KB to 1 MB range can be segmented and assigned a variety of memory types. For example, the memory locations assigned to the (shadowed) BIOS can be write protected.

In one embodiment, Memory Type Range Registers (MTRRs) are associated with ranges of memory, and store memory type access indications that control the type of memory accesses performed when information flows to or from memory locations within the memory range corresponding to the MTRR. There are three categories of MTRRs: generic, fixed, and variable.

A generic MTRR indicates which memory types are enabled and, if so, in which way. If nothing is enabled the generic MTRR includes an indication on how to handle the memory access.

The fixed MTRRs are a set of registers in the CPU, each of which contains a number of 8-bit fields, whereas each field corresponds to a predetermined memory region. In one exemplary implementation, each field of a fixed MTRR corresponds to a range of addresses within the 640 KB to 1 MB region. If a memory access is directed to an address, the processor checks the MTRR and whatever type of memory access is expressed in the MTRR is applied. The granularity can go down to a 4 KB page.

The variable MTRRs are a set of registers in the CPU including zero to n MTRRs. Each variable MTRR has a starting address and a range, both of which can vary. Each MTRR includes a base register and a mask register. The base register includes a starting address indication. The mask register includes a range indication, which determines how much memory is associated with the register's memory type indication.

Embodiments can also be implemented in systems utilizing a Programmable Attribute Table (PAT) for controlling memory accesses and indicating memory access types. In one exemplary implementation, 3 bits per page select one of 8 memory access types from a Programmable Attribute Table Model Specific Register.

While the description of embodiments is primarily presented in terms of protecting MTRR settings from illicit tampering and/or accidental changes, it is appreciated that embodiments are readily implemented for protecting PAT settings in a similar manner.

The memory access types are assigned to particular ranges of memory to achieve certain advantages desirable for the information in that range. If the memory access types are maliciously or accidentally altered, problems can arise. For example, if a memory range is assigned a relatively fast type of memory access (e.g. a cachable memory type) because it is critical that information in that range be available quickly, and the memory access type is changed to a relatively slow memory access type (e.g. an uncachable one), then problems can arise if the critical information is not available in time. Also, if a memory location that has to be updated (e.g. the address is associated with a count value that has to be updated) is changed to write protected, critical updates may be prevented from occurring. Another problem can arise if the there is sequencing information that needs to be saved, but is prevented from, because a memory range is being changed to a write protect access type. For example, if the special HMM trigger events occur, and addresses associated with what a program was doing and where in a process it stopped are written, but their memory type is changed to write protected, then the processor will not be able to return to the correct point in the interrupted process because the write protect will have prevented the storage of the requisite information.

Embodiments are directed to preventing intentional and accidental corruption of the memory access type assignment for the HMRAM range.

FIG. 1 is a flow chart of a secure Hyper Management Mode method 100 in accordance with one embodiment. Secure Hyper Management Mode method 100 enables protected Hyper Management Mode operations. In one exemplary implementation, method 100 prevents malicious and/or accidental manipulation of Hyper Management Mode information and operations.

In step 110, information processing is performed. Information processing associated with a variety of applications can be performed. In one embodiment, the information processing includes code morphing of instructions into very long instruction words. It is appreciated that embodiments are also readily adapted to non-code morphing systems.

In step 120, a determination is made if a Hyper Management Mode trigger event occurs. There are a variety of events that can trigger a Hyper Management Mode initiation.

In step 130, a secured Hyper Management Mode operation is performed. In one embodiment, the secured Hyper Management Mode operation includes securing a memory type designation associated with the Hyper Management Mode memory space. The designation can be stored in a Memory Type Range Register and/or a Programmable Attribute Table. In one exemplary implementation the secure memory access process prevents unauthorized alteration of a memory type associated with the Hyper Management Mode memory space. A memory access operation can be executed as part of the secured Hyper Management Mode operation. In one exemplary implementation, the memory access operation is directed to a write operation. In another exemplary implementation, the memory access operation is directed to a read operation.

In one embodiment, memory addresses of a computer system are assigned to various functional activities, including a region or Hyper Management Mode memory range for storing information associated with Hyper Management Mode operations. A processor performs the instructions associated with the Hyper Management Mode operations when it receives a Hyper Management Mode Interrupt. When the processor enters Hyper Management Mode, the addresses assigned to the Hyper Management Mode memory range become "visible" or accessible to the processor. The processor securely designates memory access types associated with said Hyper Management Mode memory range.

Figure 2:
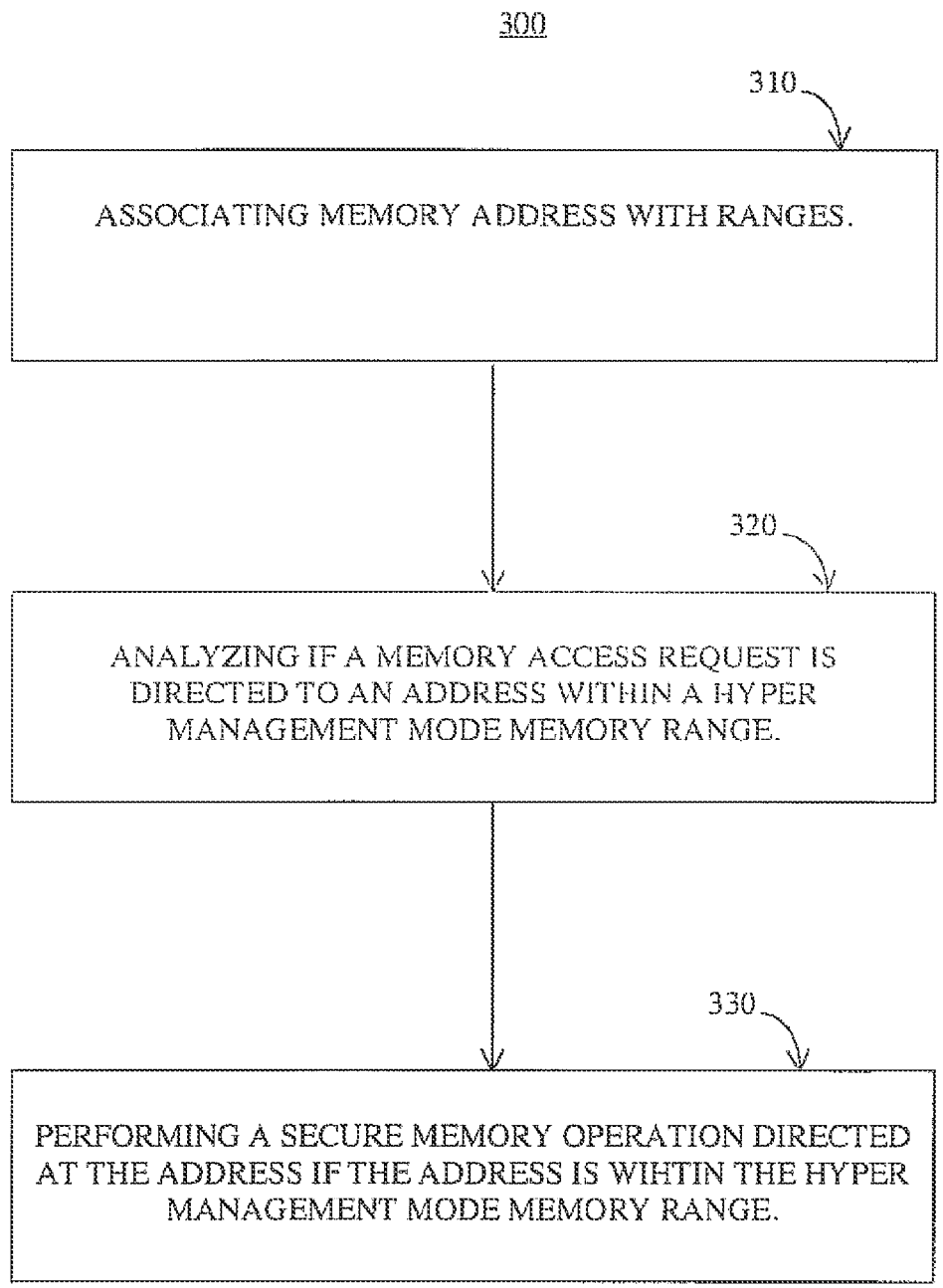
FIG. 2 is a flow chart of an exemplary secure memory access process in accordance with one embodiment.

FIG. 2 is a flow chart of a secure memory access process 300 in accordance with one embodiment. Secure memory access process 300 enables secure access of a memory while minimizing threats to memory information manipulation. In one exemplary implementation, memory access method 300 prevents malicious and/or accidental manipulation of memory access types.

In step 310, memory addresses are associated with memory ranges. It is appreciated that a maximum memory amount supported by a system can be divided up in a variety of ways. In one exemplary implementation, addresses 0 to 640 KB are dedicated memory, and there are fragmented memory spaces from 640 KB to 1 MB that store various legacy information, such as information associated with various cards (e.g. a video graphics card, interface connection cards, etc.) and other basic input output information (e.g. BIOS information). The region above 1 MB is utilized for various other main memory operations. Hyper Management Random Access Memory is assigned to a portion of the region between 1 MB and the maximum supported by the system's main memory (e.g. 1 MB up to 128 MB). The region between the end of RAM and top-of-memory can be used for peripherals.

In step 320, an analysis is made to determine if a memory access request is directed to an address within a Hyper Management Mode memory range. The memory access request can be directed to addresses from a variety of regions within a memory. For example, the memory access request can be directed to addresses in the main memory region or in memory regions associated with various other memory devices. In one embodiment, the memory access request is directed to a Hyper Management Mode memory space. If the memory access request is not directed to an address within the Hyper Management Mode memory range, then the request is handled in a traditional way. If the memory access request is directed to an address within the Hyper Management Mode memory range the process proceeds to step 330.

In step 330, a secure memory operation directed at the address is performed if the address is within the Hyper Management Mode memory range. In one embodiment, memory type designations associated with the Hyper Management Mode memory range are secured if the memory access request is directed to an address within the Hyper Management Mode memory range. Securing the memory type designations associated with the Hyper Management Mode range ensures that when the Hyper Management Mode is exited the appropriate memory type designations are still associated with the Hyper Management Mode memory range.

In one embodiment, the memory type designations associated with the Hyper Management Mode memory range are stored in a secure location before permitting access to the memory Hyper Management Mode memory range. The memory designations are restored when exiting the Hyper Management Mode memory range. This can be done explicitly or implicitly. In an explicit implementation the first few instructions executed upon entry into HMM direct saving, while the last few instructions before exit from HMM direct restoring. In an implicit implementation, the processor—upon receiving a HMI—saves the MTRR settings associated with HMRAM elsewhere as part of entering HMM, before it writes or changes anything in HMRAM. It saves all the "old" states and sets the MTRRs to a suitable state. In one exemplary implementation, a snapshot of the old values is included as part of the HSM; said snapshot is restored during exit from HMM. There are various optimizations; e.g. only the valid MTRRs can be saved, or only MTRRs that deal with HMRAM addresses but not MTRRs associated with other memory regions.

There are various ways in which the restore of the variable MTRRs can be implemented. All MTRRs can be written back or just the variable MTRRs can be written back. It is also possible to write only the previously saved ones back. In one exemplary implementation, the restoring includes enabled memory type range register information.

In another embodiment, a determination is made if the processor is in Hyper Management Mode, e.g. by examining a Hyper Management Mode indication bit. Memory designations are set to a predetermined type if the processor is in Hyper Management Mode. In one exemplary implementation, the Hyper Management Mode memory access type is set to a write back designation when exiting the memory access operations.

Embodiments can also include intercepting accesses to MTRRs and/or the PAT MSR, and preventing changes to their true values, alternatively setting those true values to a predetermined default memory access type.

Thus, embodiments facilitate efficient and secure Hyper Management Mode operations. Adverse impacts associated with malicious or accidental unauthorized manipulations of memory access types associated with Hyper Management Mode memory space are reduced.

The foregoing descriptions of specific embodiments have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. A computer-readable storage device comprising computer-executable instructions stored therein, the computer-executable instructions comprising:
    instructions to store memory configuration information; and
    instructions to perform a security enhancing operation on the memory configuration information in response to switching from a first processor operating mode to a second processor operating mode.

2. The computer-readable storage device of claim 1, wherein the instructions to store comprise:
    instructions to receive the memory configuration information at memory type range registers (MTRRs).

3. The computer-readable storage device of claim 1, wherein the instructions to store comprise:
    instructions to receive the memory configuration information at a programmable attribute table (PAT).

4. The computer-readable storage device of claim 1, wherein the instructions to perform comprise:
    instructions to move the memory configuration information from a first memory location to a second memory location.

5. The computer-readable storage device of claim 4, wherein the instructions to perform further comprise:
    instructions to change the memory configuration information at the first memory location.

6. The computer-readable storage device of claim 4, wherein the computer-executable instructions further comprise:
    instructions to perform a second security enhancing operation on the memory configuration information in response to switching from the second processor operating mode to the first processor operating mode.

7. The computer-readable storage device of claim 6, wherein the instructions to perform the second security enhancing operation comprise:
    instructions to move the memory configuration information from the second memory location to the first memory location.

8. The computer-readable storage device of claim 1, wherein the second processor operating mode is a Hyper Management Mode, and wherein the memory configuration information includes memory type designations for memory ranges associated with the Hyper Management Mode.

9. A computer-readable storage device comprising computer-executable instructions stored therein, the computer-executable instructions comprising:
    instructions to store memory configuration information associated with a processor operating mode in a first memory location; and
    instructions to perform a security enhancing operation on the memory configuration information by using the first memory location and a second memory location in response to switching into the processor operating mode.

10. The computer-readable storage device of claim 9, wherein the instructions to store comprise:
    instructions to receive the memory configuration information at the first memory location in memory type range registers (MTRRs).

11. The computer-readable storage device of claim 9, wherein the instructions to store comprise:
   instructions to receive the memory configuration information at the first memory location in a programmable attribute table (PAT).

12. The computer-readable storage device of claim 9, wherein the instructions to perform comprise:
   instructions to move the memory configuration information from the first memory location to the second memory location.

13. The computer-readable storage device of claim 12, wherein the instructions to perform further comprise:
   instructions to change the memory configuration information at the first memory location.

14. The computer-readable storage device of claim 12, wherein the computer-executable instructions further comprise:
   instructions to perform a second security enhancing operation on the memory configuration information in response to switching out of the processor operating mode,
   wherein the instructions to perform the second security enhancing operation comprise:
   instructions to move the memory configuration information from the second memory location to the first memory location.

15. The computer-readable storage device of claim 9, wherein the processor operating mode is a Hyper Management Mode, and wherein the memory configuration information includes memory type designations for memory ranges associated with the Hyper Management Mode.

16. A computer-readable storage device comprising computer-executable instructions stored therein, the computer-executable instructions comprising:
   instructions to detect a mode-triggering event;
   instructions to switch from a first processor operating mode to a second processor operating mode if the mode triggering event is detected; and
   instructions to perform a security enhancing operation on memory configuration information associated with the second processor operating mode.

17. The computer-readable storage device of claim 16, wherein the instructions to perform comprise:
   instructions to move the memory configuration information from a first memory location to a second memory location.

18. The computer-readable storage device of claim 17, wherein the instructions to perform further comprise:
   instructions to change the memory configuration information at the first memory location.

19. The computer-readable storage device of claim 17, wherein the computer-executable instructions further comprise:
   instructions to perform a second security enhancing operation on the memory configuration information in response to switching from the second processor operating mode to the first processor operating mode,
   wherein the instructions to perform the second security enhancing operation comprise:
   instructions to move the memory configuration information from the second memory location to the first memory location.

20. The computer-readable storage device of claim 16, wherein the second processor operating mode is a Hyper Management Mode, and wherein the memory configuration information includes memory type designations for memory ranges associated with the Hyper Management Mode.

* * * * *

UNITED STATES PATENT AND TRADEMARK OFFICE
CERTIFICATE OF CORRECTION

PATENT NO. : 8,359,443 B2
APPLICATION NO. : 13/165560
DATED : January 22, 2013
INVENTOR(S) : Ludloff et al.

Page 1 of 1

It is certified that error appears in the above-identified patent and that said Letters Patent is hereby corrected as shown below:

On Title Page 2, Item (56), under "OTHER PUBLICATIONS", in Column 2, Line 5, delete "Firts-Year" and insert -- First-Year --, therefor.

On Title Page 2, Item (56), under "OTHER PUBLICATIONS", in Column 2, Line 19, delete "Authetication"," and insert -- Authentication", --, therefor.

In the Drawings

In Fig. 1, Sheet 1 of 2, delete "FIG" and insert -- FIG. --, therefor.

In Fig. 2, Sheet 2 of 2, delete "FIG" and insert -- FIG. --, therefor.

In the Specification

In Column 3, Line 29, delete "Model Specific Register." and insert -- Model Specific Register (MSR). --, therefor.

In Column 4, Line 41, delete "method 300" and insert -- process 300 --, therefor.

In Column 5, Line 33, delete "HSM;" and insert -- HMM; --, therefor.

Signed and Sealed this
Eighteenth Day of March, 2014

Michelle K. Lee
*Deputy Director of the United States Patent and Trademark Office*